INVENTORS
SOUTHWICK W. BRIGGS &
WILLIAM A. BRAZEROL

ATTORNEY 3,310,177
FILTER WITH PLEAT SPACING MEANS
Southwick W. Briggs, Chevy Chase, Md., and William A. Brazerol, Washington, D.C. (both % Stone Filter Co., Inc., 900 Franklin St. NE., Washington, D.C. 20017)
Filed June 2, 1964, Ser. No. 371,900
5 Claims. (Cl. 210—457)

This invention relates to pleated paper filters and is primarily concerned with arrangements for maintaining the outer folds of a pleated paper medium in spaced relationship so that a maximum surface area of the medium will be available for filtering purposes.

There is a tendency for the outer folds of pleated paper media to collapse under operating pressure conditions unless some provision is made to maintain these outer folds in spaced relationship. When such collapse occurs, the effective filtering surface area is reduced, impairing the effectiveness of such filters and substantially shortening their useful lives.

It has been proposed in the past to adhesively bond an outer cover member to the outer folds of a pleated paper medium, but the cost of materials and manufacturing steps has been substantial and wherever the adhesive has covered the surface of the medium, such surface areas are lost as useful filtering portions of the medium.

It is among the objects of the present invention to solve such problems by providing a filter comprising a perforated center tube, a permeable paper filter medium having axial pleats defining inner and outer folds, the inner folds engaging the center tube, a perforated cover member surrounding the medium and a pleated spacer interposed between the cover member and outer folds maintaining the outer folds in spaced relationship. The spacer preferably provides a pleat receiving each of the outer folds of the filter medium and a plurality of spaced pleated spacers are preferably interposed between the cover member and outer folds. The spacers are preferably adhesively bonded to the cover member and such spacer or spacers preferably contain pleats of less depth than those of the medium itself.

A more complete understanding of the invention will follow from a description of the accompanying drawings wherein.

Figure 1:
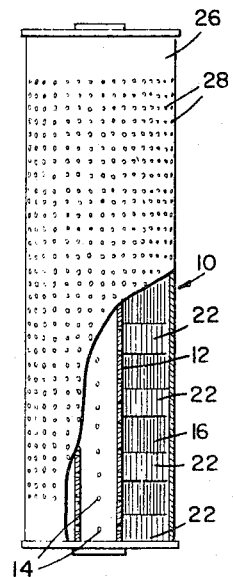
FIG. 1 is an elevation, partially broken away, depicting a filter embodying the present invention.
Figure 2:
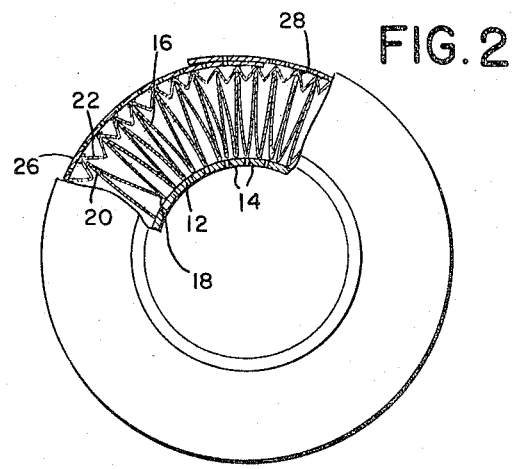
FIG. 2 is a plan view, partially broken away, of a filter like that of FIG. 1, on an enlarged scale.

The filter 10 includes a center tube 12 containing perforations 14. A pleated paper filter medium 16 surrounding the center tube 12 has inner folds 18 engaging the outer periphery of the center tube and outer folds 20 maintained in spaced relationship by means of pleated strips 22 having a pleat for each pleat of the filter medium. The outer folds 24 of the pleated strips 22 are adhesively bonded to the inner surface of the outer cover member 26 containing perforations 28.

The strips 22 are preferably pleated simultaneously with the filter medium 16 in a conventional form of pleating machine, and after the pleated medium and strips are wrapped about the center tube 12, the cover member 26 will be wrapped around the pleated strips and bonded thereto by an adhesive composition 28 consistent with the materials used to fabricate the filter and those to undergo filtration. Where hydrocarbon lubricants at elevated temperatures are to be filtered, the composition of the adhesive may include thermosetting resins such as phenolformaldehyde resins. The pleated spacers may be formed from a variety of materials such as various types of paper and they may assume the form of filter paper similar in composition to that of the medium itself. The end pleats of the medium are preferably secured together after it has been wrapped about the center tube, by stapling, adhesive, or otherwise, before the cover member 26 is applied.

Figure 3:
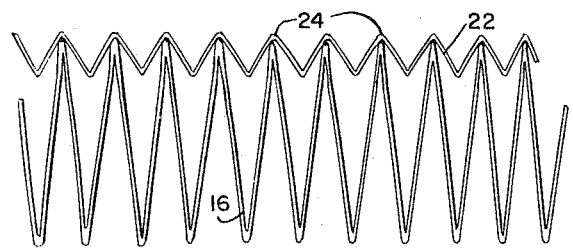
FIG. 3 depicts one form of pleated spacer in cooperation with a pleated filter medium, in end elevation.
Figure 4:
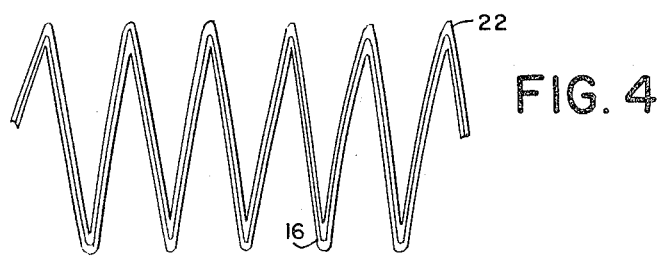
FIG. 4 depicts another form of pleated spacer in cooperation with a pleated medium, in end elevation.

The spacers 22 depicted in FIG. 3 are shown as having pleats of a depth substantially less than those of the medium. In the case of the form of the invention depicted in FIG. 4, the strips 22 are shown as having pleats of depths equal to those of the filter medium 16.

Such variations of the present invention as will suggest themselves to those skilled in the art are contemplated within the scope of the appended claims.

We claim:

1. A filter comprising a perforated center tube, a permeable paper filter medium having axial pleats defining inner and outer folds, said inner folds engaging said center tube, a perforated cover member surrounding said medium, and a pleated spacer interposed between said cover member and outer folds maintaining said outer folds in spaced relationship, said pleated spacer having an inner fold extending freely between each pair of adjacent pleats of said medium and outer folds adhesively bonded to said cover member.

2. A filter according to claim 1 wherein said spacer contains pleats of less depth than those of asid medium.

3. A filter according to claim 1 wherein said spacer is a filter medium.

4. A filter according to claim 1 wherein a plurality of spaced pleated spacers are interposed between said cover member and outer folds.

5. A filter according to claim 4 wherein said spacers are adhesively bonded to said cover member.

References Cited by the Examiner

UNITED STATES PATENTS

| | | | |
|---|---|---|---|
| 2,675,127 | 4/1954 | Layte | 210—493 |
| 2,988,227 | 6/1961 | Harms | 210—493 |
| 3,241,680 | 3/1966 | Humbert | 210—493 |

FOREIGN PATENTS

| | | |
|---|---|---|
| 1,059,010 | 1/1953 | France. |
| 1,130,459 | 9/1956 | France. |
| 1,118,758 | 12/1961 | Germany. |
| 823,648 | 11/1959 | Great Britain. |

REUBEN FRIEDMAN, *Primary Examiner.*

F. MEDLEY, *Assistant Examiner.*